United States Patent [19]
Simeti

[11] 3,950,885
[45] Apr. 20, 1976

[54] MOLDED ONE-PIECE PLASTIC CRAB TRAP WITH INTEGRAL OUTWARDLY BIASED HINGE ELEMENTS

[76] Inventor: Samuel Simeti, 228 N. Poplar St., North Massapequa, N.Y. 11758

[22] Filed: July 7, 1975

[21] Appl. No.: 593,616

Related U.S. Application Data

[63] Continuation-in-part of Ser. No. 504,806, Sept. 10, 1974, abandoned.

[52] U.S. Cl. ............................................. 43/105
[51] Int. Cl.² ..................................... A01K 69/10
[58] Field of Search ................... 43/105, 102, 100

[56] References Cited
UNITED STATES PATENTS

| | | | |
|---|---|---|---|
| 1,054,880 | 3/1913 | Sroboda | 43/105 |
| 2,821,047 | 1/1958 | Ruiz | 43/102 |
| 3,245,173 | 4/1966 | Sylvester | 43/102 |
| 3,553,881 | 1/1971 | Hasseman | 43/105 |

Primary Examiner—Warner H. Camp
Attorney, Agent, or Firm—Nolte and Nolte

[57] ABSTRACT

A molded plastic crab trap is shown and disclosed which has novel portions formed from a one-piece plastic molding. By special handling at the time of the unmolding, the various hinge elements which integrally join a bottom member to vertical side members and which join a plurality of top members to the side members, all are permanently biased so as to urge the side and top members to open outwardly to the open position. A centrally located post with a guide ring is attached to the center of the bottom member and a plurality of pull strings are attached to the top of each of the top members which pass through the guide ring and are manually operable to close the trap about its contents.

3 Claims, 10 Drawing Figures

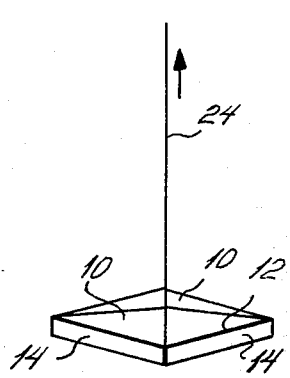 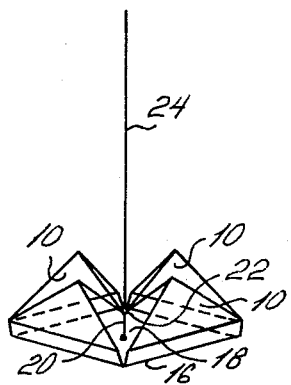 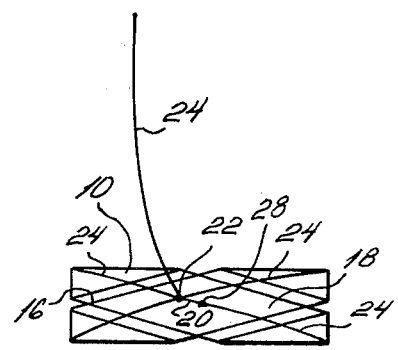
FIG. 1A  FIG. 1B  FIG. 1C
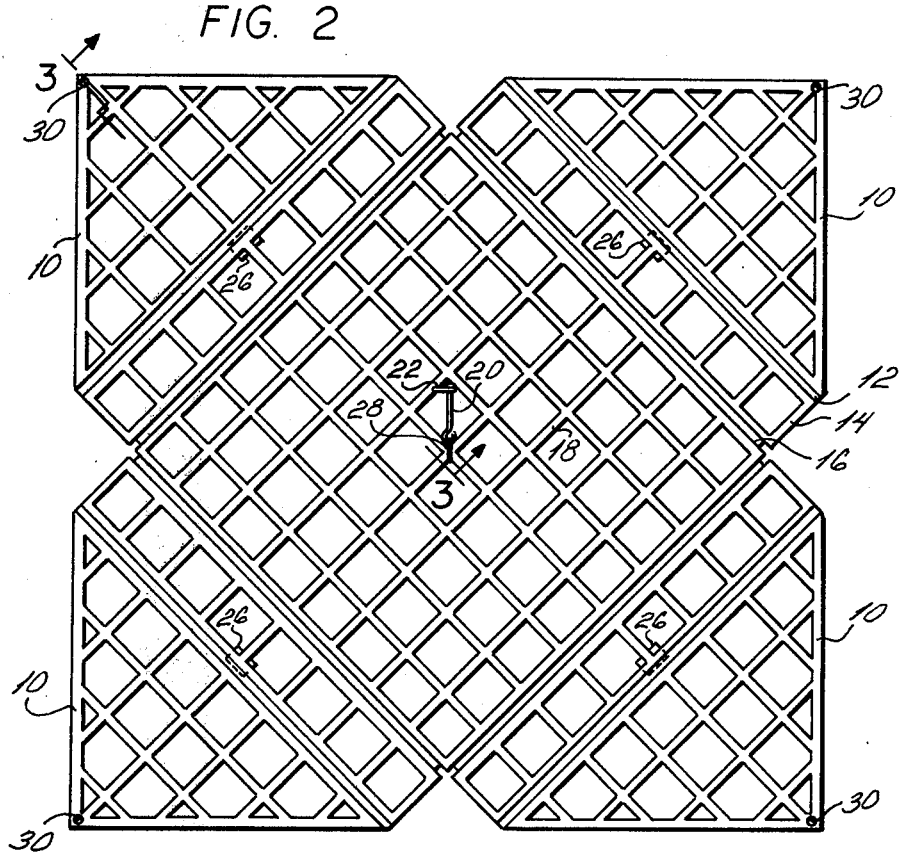
FIG. 2
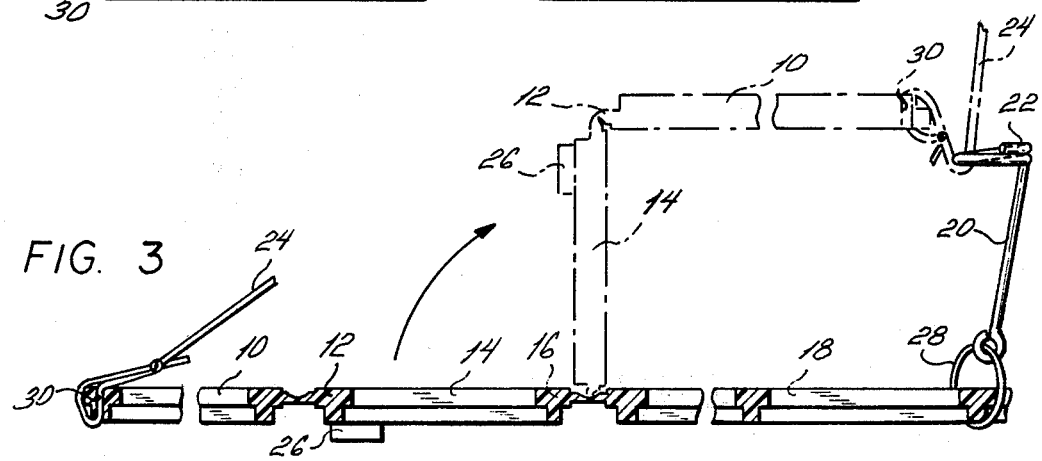
FIG. 3

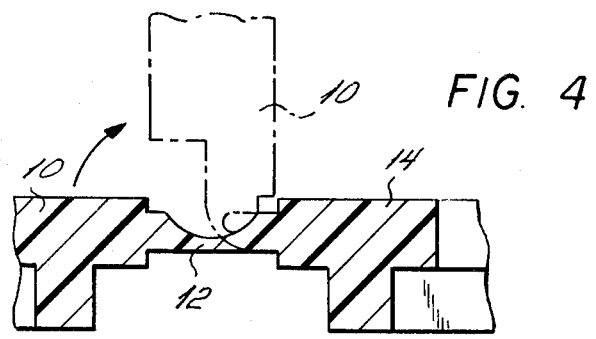
FIG. 4
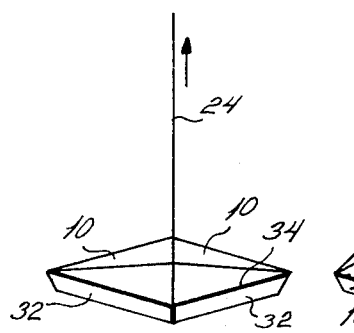
FIG. 5A
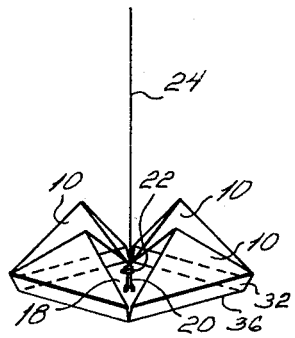
FIG. 5B
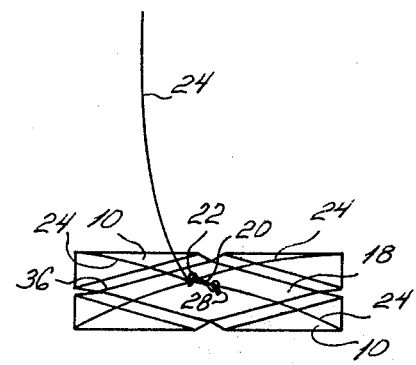
FIG. 5C
FIG. 6
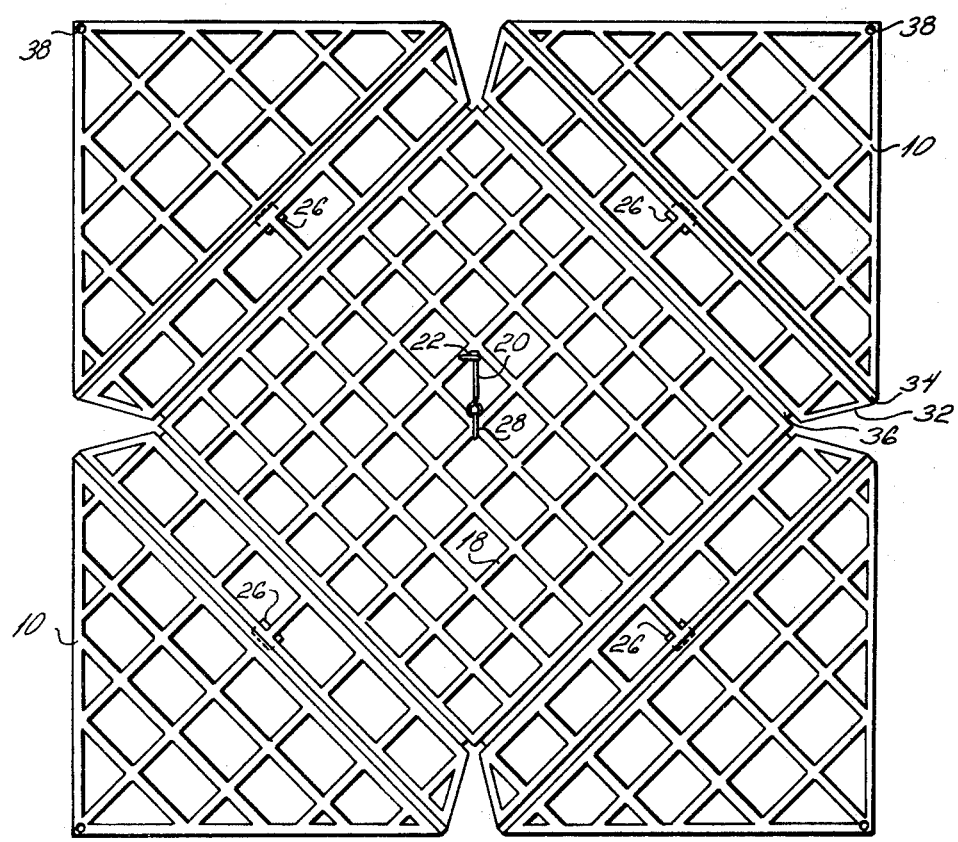

MOLDED ONE-PIECE PLASTIC CRAB TRAP WITH INTEGRAL OUTWARDLY BIASED HINGE ELEMENTS

RELATED APPLICATION

This application is a continuation-in-part of application Ser. No. 504,806, filed Sept. 10, 1974 and now abandoned.

BACKGROUND OF THE INVENTION

1. Field

This application relates to the field of fish and crab traps.

2. Prior Art

The patent to Krulis, U.S. Pat. No. 1,188,185 illustrates the so-called "Star Trap" which has been the standard trap in use for many years. Typically, such traps are constructed from wire mesh and have a square bottom member to which are hingedly attached four triangular wire mesh members. A post is attached to the bottom member which holds the bait in position and acts as a guide for lifting ropes which close the trap on whatever is in the trap. The hinges are metal springs which force the side members out flat when tension on the lifting ropes is released. Since such traps have been made of metal and since metal corrodes rapidly in sea water, the prior art traps suffer from constant maintenance problems in that the expensive springs are constantly breaking and must be repaired or replaced.

While one-piece molded plastic lobster pots have been proposed (U.S. Pat. No. 3,245,173 to Sylvester), none have proved to have wide-spread acceptance. Furthermore, the use of such catching crabs has not been proposed.

SUMMARY OF THE INVENTION

The crab trap in this invention is unique in that it takes the place of the prior art trap, is different in construction, is relatively maintenance-free and, because of its construction, operates more reliably than the prior art "Star Trap."

Briefly, the trap of this invention is a one-piece molded plastic construction having a substantially square bottom member, four rectangularly shaped vertical side members, each of which is integrally joined to the bottom member by one or more "living" hinges and have weight attaching elements formed therein; four triangularly shaped top members, each of which is integrally joined to said side members by one or more living hinges; and a post attached to the center of the bottom member having a guide ring at the top thereof for holding the bait in position and for guiding the four closing lines. The end of each closing line is attached to an apex of each of the four top members and passes through the guide ring and is hand-held.

An important feature of the trap of this invention is the provision of weights attached to each side members. Since the "living" hinges tend to force the side and top members out into the fully open position, the weights add an important impetus to assist the hinges in causing the trap to open up fully as soon as tension is released on the closing lines. Similarly, as soon as tension is placed on the four closing lines, the top members first start to close and as the closing lines are drawn tighter, the side members swing to a vertical position, thus positively closing the entire trap about its contents.

DESCRIPTION OF THE DRAWINGS

FIG. 1a is a perspective of one form of the trap of this invention in the fully closed position;

FIG. 1b is a perspective of the same form of the trap of this invention illustrated in FIG. 1a in a partially open position;

FIG. 1c is a perspective of the same form of the trap of this invention in the fully open position;

FIG. 2 is a plan view of the one form of the trap of this invention shown in FIGS. 1a through 1c showing all of the elements except the bait line and closing lines;

FIG. 3 is a partial cross-sectional view of the trap of FIG. 2 taken on the line 3—3 of FIG. 2 showing in phantom lines the closing action of the trap of this invention;

FIG. 4 is a partial cross-sectional view illustrating the "living hinge" and the cross-section forming the trap's bottom, side and top member portions;

FIG. 5a is a view similar to FIG. 1a of a second form of the trap of this invention;

FIG. 5b is a perspective of the same form of the trap of this invention illustrated in FIG. 5a in a partially closed position;

FIG. 5c is a perspective of the same form of the trap of this invention shown in FIG. 5a in the fully open position;

FIG. 6 is a plan view of the second form of the trap of this invention showing all of the elements except the bait line and closing lines.

DESCRIPTION OF THE PREFERRED EMBODIMENTS

Referring to FIGS. 1a through 1c, it will be seen that the crab trap of this invention is comprised of four top members 10 which are integrally joined by "living" hinges 12 to vertical side members 14 which are in turn integrally connected by "living" hinges 16 to a bottom member 18. A post 20 is attached to the bottom member 18 which has a guide ring 22. A plurality of closing lines 24 are provided which pass through the guide ring 22 and are each attached to the apex of the top members 10. In this instance, since there are four top members 10, there will be four strands making up the closing strands 24.

As shown in FIG. 1a, with the tension being applied to closing strands 24, all four of the top members 10 join over the bottom member 18 and, along with the vertical side members 14, fully close the trap about its contents.

Referring now to FIG. 3, each of the top member portions 10 are integrally joined by "living" hinges 12 to the vertical side members 14 which in turn are integrally joined by "living" hinges 16 to bottom member 18.

While the "living" hinges 12, 16 are illustrated as being one continuous hinge, it will be appreciated that a plurality of such "living" hinges could be provided rather than the single one there shown, it only being required that there be enough of a spring exerted by the "living" hinges 12, 16 to cause the top members 10 and the vertical side portions 14 to be constantly biased outwardly into the fully open position as illustrated in FIG. 3.

Illustrated at 26 on each of the side members 14 is a pocket for holding a weight near the top edge of each of the side members 14. When an appropriate weight is inserted into the pockets 26, that will further assist the "living" hinges 12, 16 to bias the side members 14 towards the outward position when tension is released on the closing strands 24.

Referring now to FIG. 3, it will be seen that the post 20 is joined by ring 28 to bottom member 18 and the closing strands 24 pass through the guide ring 22 and are attached to the apex of the top member portions 10 as illustrated at 30. It will be appreciated that the other function of the post 20 is to hold the bait into position over the bottom member 18. When tension is originally applied to guide strands 24, the top members 10 tend to swing upwardly into a vertical position before the further tension causes the vertical side members 14 to swing into the vertical position (as illustrated in phantom lines in FIG. 3) and the top elements 10 to assume the horizontal position illustrated in phantom lines over the bottom member 18 thus fully closing the trap.

As illustrated in FIG. 2, the side members 14 form between their respective ends a 90° angle so that upon closing, there is a closed line between the ends of the side members 14.

In FIG. 4, the "living" hinge 12 is illustrated with a portion of the top member 10 illustrated in cross section showing the ribbed construction for added strength of the members which make up the top portion 10 and elements of the side portions 14. In phantom lines, the top member 10 is shown in its position which it would assume at about the time there is sufficient tension on strands 24 to cause a top member 10 to start to move into the closed position substantially as illustrated and described above.

FIGS. 5a through 5c are views similar to FIGS. 1a through 1c and show a second form of the trap of this invention in its fully closed position, partially closed position and in the fully open position respectively. In this instance, the same elements are given the same reference characters. The fundamental difference between the two forms of the crab trap of this invention is illustrated fully in FIG. 6. FIG. 6 is a plan view similar to FIG. 2 except the included angle between the ends of the side members 32 of this embodiment of the crab trap of this invention is a 30° angle as opposed to the 90° angle shown in FIG. 2. This lesser acute angle permits a more rapid closing and a quicker joint between the ends of the side members 32 as the trap of this invention is closed.

Again, weight pockets 26 are provided for holding weights to assist the action of the "living" hinges 34, 36 in quickly and positively opening the trap into its fully open position as illustrated in FIG. 5c and as shown in plan view in FIG. 6.

As before, closing stands 24 are joined to the openings 38 at the apex of each of the top members 10 and pass through the guide ring 22 of post 20 which is attached to the bottom member 18.

The crab trap of this invention is advantageously molded as one piece in that the bottom member portion, the side member portions and the top member portions are all formed at one time by a single molding. Ideally, the various ribs which form the open mesh structure of the trap of this invention are T-shaped for substantial rigidity and permanence. At the time the pieces are molded, the weakened sections which form the one or more living hinges are stressed prior to cooling to form what is known in the art as a "living" hinge. In other words, there is an orientation of the polymers along the thinned area which forms the hinge portion or portions which, by flexing at the time of unmolding, causes the pieces always to return to their as molded or substantially coplanar position when not otherwise restrained. This outward biasing effect is important which, when taken along with the leverage effect of the weights positioned at the top of each of the side members, permits a positive and reliable force to always open the trap whenever tension is released to closing strands 24.

While the two embodiments of the crab trap of this invention are illustrated as having square bottom members and triangular shaped top members along with rectangular shaped side members, it is appreciated that other shapes of bottom members and corresponding shapes of side and top members could be employed without departing from the scope of the appended claims.

What is claimed is:

1. A molded one-piece plastic crab trap having a bottom member portion; a plurality of side member portions integrally joined to said bottom member portion along each edge thereof; a plurality of top member portions integrally joined to the top edge of each of said side members; a plurality of weights, at least one of which is positioned on each of said side members near the top edge thereof; means for integrally joining said members, said joining means constituting means for permanently biasing said side and top portions toward the open position; a center post element attached to said bottom member portion having a guide ring formed at the top thereof; and a plurality of closing strands, each one of which is attached to the top of a respective top member portion and which passes through said guide ring, whereby when said closing strands are free of tension, said side and top member portions assume the open position and are substantially coplanar with said bottom member portion and when tension is applied to said closing strands, said top and said side member portions are pulled into a closed position over said bottom member enclosing the contents of said trap.

2. The crab trap of claim 1 wherein said top member portions are four in number, wherein said bottom member is substantially square in shape, said side members are four in number and have a right angle included between each of their respective ends.

3. The crab trap of claim 1 wherein there is a substantially square bottom member and four side member portions and four top member portions and wherein the included angle between the ends of said side members is an acute angle.

* * * * *